Nov. 4, 1969    E. H. WARNE    3,475,908
FUEL SYSTEMS FOR GAS TURBINE ENGINES
Filed Oct. 3, 1967    2 Sheets-Sheet 1

United States Patent Office 3,475,908
Patented Nov. 4, 1969

3,475,908
FUEL SYSTEMS FOR GAS TURBINE ENGINES
Eugene Harold Warne, Solihull, England, assignor to Joseph Lucas (Industries) Limited, Birmingham, England, a British company
Continuation-in-part of application Ser. No. 649,687, June 28, 1967. This application Oct. 9, 1967, Ser. No. 673,902
Int. Cl. F02g 3/00; F02c 9/08
U.S. Cl. 60—39.28                4 Claims

ABSTRACT OF THE DISCLOSURE

In a gas turbine engine fuel system there is a centrifugal type pump which the delivery pressure depends upon speed, a servo operated throttle between the pump and the engine, a speed responsive device between the pump and the throttle, this device being operator adjustable and creating a pressure drop in the flow which is related to speed, and the throttle servo, being controlled through a device in accordance with variations in engine generated pressures.

---

This application is a continuation-in-part of U.S. patent application Ser. No. 649,687, filed June 28, 1967, and now abandoned.

This invention relates to fuel systems for gas turbine engines, and has for its object to provide such a system in a simple and convenient form.

In accordance with this invention a fuel system for a gas turbine engine comprises the combination of a pump in which the delivery pressure is dependent upon speed, a servo operated throttle arranged to meter the flow of fuel from the pump to the engine, and a speed responsive device disposed between the pump and the throttle and being adjustable by an operator and adapted to create a pressure drop in the flow to the throttle which is related to speed, the servo device for operating the throttle being controlled in accordance with the pressure drop which is modified in accordance with variations of a control device responsive to changes in pressures developed within the engine.

Figure 1:
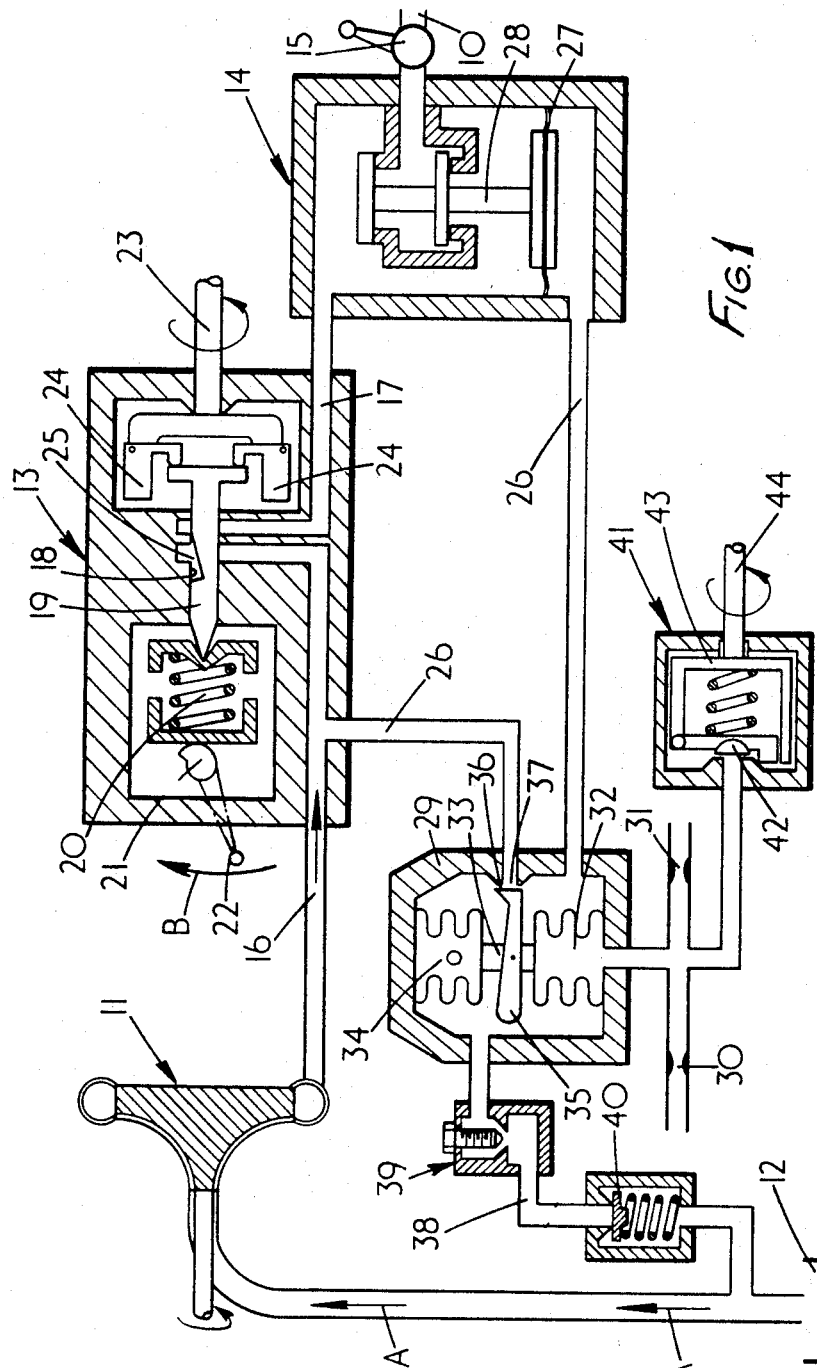
Figure 2:
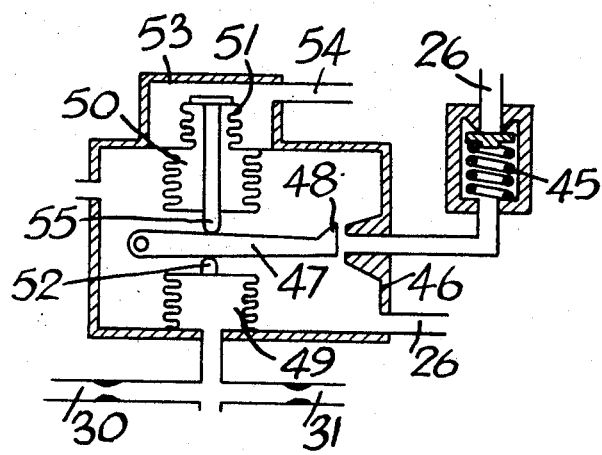

The invention will now be described, simply by way of example, with reference to the accompanying drawing in which:

FIGURE 1 is a diagrammatic representation of a fuel system in accordance with the present invention, and FIGURE 2 is a representation of an alternative form of control device for use in the system.

The fuel system illustrated is for use in conjunction with a gas turbine engine (not shown) which has a plurality of burners which are supplied through a pipe 10 from the system. The engine is arranged to drive a centrifugal pump indicated at 11 which obtains supplies of fuel via a pipeline from a reservoir 12 indicated by arrows A, and delivers it to the outlet pipe 10 through a speed responsive device indicated at 13 and a servo operated throttle 14. The outlet pipe 10 includes a shut-off valve 15.

The fuel delivered from the pump 11 is at a pressure which is dependent upon the speed of the engine, this being a characteristic of centrifugal pumps, and is supplied to the speed responsive device 13 through a passage 16. Another passage 17 affords communication between the speed responsive device 13 and the servo operated throttle 14. The passages 16 and 17 intercommunicate internally of the speed responsive device 13 through a bore 18 within which is disposed a member 19, the position of which is determined by a spring 20, the loading of which is determined by an operator through a cam 21 movable by a control lever 22 as indicated by arrow B and also in accordance with engine speed which is applied to a shaft 23 carrying a plurality of pivotal weights 24 which are arranged to act against a head of the member 19. The member 19 has a slot 25 which is arranged to control the flow of fuel between the passages 16 and 17.

The speed responsive device 13 therefore provides a pressure drop in the flow of fuel to the engine, which is related to the engine speed, this pressure drop being applied through the passage 17 and a passage 26 respectively to the opposite sides of a diaphragm 27 which carries the actuating member 28 of the servo operated throttle 14.

The pressure on the passage 26 which communicates with the passage 16 at the upstream side of the speed responsive device 13, is however, connected through a body 29 of a control device which is arranged to modify the pressure in the passage 26 in accordance with fluid pressures developed within the engine, and in this example these pressures are those existing at the upstream and downstream side of the engine compressors, and are applied from restricted passages 30 and 31 respectively to a capsule 32 within the body 29. A bar 33 is carried on the capsule 32 and is connected at its opposite end to an evacuated capsule 34. An arm 35 is pivotally connected to the bar 33 between the two capsules 32 and 34 and has a knife edge 36 arranged to control the flow of fuel through an orifice 37 at the end of the portion of the passage 26 leading to the body 29. Moreover, a passage 38 incorporating an adjustable restrictor 39 is disposed between the interior of the body 29 and the inlet to the pump 11. Thus, the pressure in the passage 26 is dependent upon the ratio of the pressures in the two passages 30 and 31 and also upon the opening of the adjustable restrictor 39. Consequently, the pressure drop across the speed responsive device 13 which is applied to the servo operated throttle 14 is varied in accordance with changes in the pressure developed in the engine compressors.

Since pump delivery pressure is related to speed, at low speeds the control device is unable to operate correctly and there is therefore provided a valve 40 between the pump inlet and the restrictor 39 and which is operable to permit flow to the body 29 of the control device only when the pump delivery pressure has reached a predetermined value.

As illustrated in the drawing, the pressure in the capsule 32 can be modified by a device 41 incorporating a valve 42 for permitting escape of fluid from the capsule 32, this valve 42 being positioned in accordance with the speed of rotation of a rotor 43 to which it is connected. The rotor 43 is, in this example, driven by a free turbine (not shown) through a shaft 44. In this example the engine is used to drive the free turbine, but it is contemplated that the fuel system can be used in conjunction with an engine of the kind having two independently rotatable shafts normally carrying respective compressors and turbines, and the shaft 44 would in this case be driven by one of the engine shafts, while the shaft 23 and the pump 11 would be driven by the other engine shaft. It is, however, to be understood that the device 41 may be dispensed with, so that the pressure in the capsule 32 is entirely dependent upon the ratio of the pressures in the passages 30 and 31.

In the modified form of control device in FIGURE 2 there is a pressurising valve 45 in the portion of the passage 26 between the control device and the upstream side of the device 13.

The body 46 of this device contains an arm 47 carrying a knife 48 controlling flow through the passage 26 and through the body 46. The angular position of the arm 47 is determined by a capsule 49 and a further pair of capsules 50, 51, the interiors of the latter pair being in communication with one another.

The interior of the capsule 49 is open to the passages 30, 31 and this capsule carries a rod 52 acting upon the arm 47.

The interiors of the capsules 50, 51 are evacuated and the capsule 51 is disposed in a chamber 53 in the body 46 to which air under pressure at a pressure obtained from an intermediate stage of the engine compressor stage is admitted through a passage 54. The capsules 50, 51 carry a further rod 55 acting upon the arm 47 at the opposite side from the arm 52.

The cross-sectional areas of the capsules 50, 51 differ from one another in a proportion chosen in accordance with the ranges of the pressures exerted in use upon these capsules respectively.

Having thus described my invention what I claim as new and desire to secure by Letters Patent is:

1. A fuel system for a gas turbine engine comprising the combination of a centrifugal type pump in which the delivery pressure is dependent upon speed, a servo operated throttle arranged to meter the flow of fuel from the pump to the engine, and a speed responsive device disposed between the pump and the throttle, a manual adjuster on said speed responsive device, said device being arranged to create a pressure drop in the flow to the throttle, said pressure drop being related to speed, and a control device responsive to changes in pressures within the engine, said control device being arranged to control the servo device for operating the throttle.

2. A fuel system as claimed in claim 1 in which the speed responsive device comprises a member, a speed responsive mechanism arranged to move said member axially in accordance with speed changes, means on the member for controlling the flow of fuel between the pump and the throttle in accordance with the axial position of the member, a spring acting on the member opposing the action of the speed responsive mechanism with increasing speed, and the spring acting against a part, the position of which is controlled by said manual adjuster.

3. A fuel system as claimed in claim 1 in which the servo device has an actuating member, and a diaphragm carried by said member and the pressure drop in the flow of fuel to the engine is applied to opposite sides of said diaphragm through passages, one of which communicates with the servo device through said control device.

4. A fuel system as claimed in claim 1 in which the control device comprises a body, a pair of passages communicating with the interior of the body, one of said passages communicating at its other end with the pump outlet and the other passage communicating at its other end with the servo device of the throttle, two interconnected capsules within the body, one of said capsules being evacuated and the other being subjected to changes of pressure within the engine, an arm carried between the capsules, the end of said arm being arranged to control the flow of fuel through said body.

References Cited
UNITED STATES PATENTS

| | | |
|---|---|---|
| 2,422,808 | 6/1947 | Stokes. |
| 2,644,513 | 7/1953 | Mock _____ 60—39.28 |
| 3,106,934 | 10/1963 | Rogers et al. ____ 60—39.28 X |

AL LAWRENCE SMITH, Primary Examiner